United States Patent [19]

Leenslag

[11] Patent Number: 5,234,960
[45] Date of Patent: Aug. 10, 1993

[54] PROCESS FOR PREPARING FOAMS

[75] Inventor: Jan W. Leenslag, Neerijse, Belgium

[73] Assignee: Imperial Chemical Industries PLC, London, England

[21] Appl. No.: 838,951

[22] Filed: Feb. 21, 1992

[30] Foreign Application Priority Data

Feb. 22, 1991 [GB] United Kingdom ............... 9103715

[51] Int. Cl.⁵ .............................................. C08G 18/28
[52] U.S. Cl. ..................................... 521/51; 521/108; 521/163; 252/182.26
[58] Field of Search ............... 521/51, 108, 163; 252/182.26

[56] References Cited

U.S. PATENT DOCUMENTS

| 4,166,164 | 8/1979 | Cenker et al. | 521/129 |
| 5,071,881 | 12/1991 | Parfondry | 521/137 |
| 5,089,534 | 2/1992 | Thoen et al. | 521/106 |

FOREIGN PATENT DOCUMENTS

| 403066 | 12/1990 | European Pat. Off. |
| 1234946 | 6/1971 | United Kingdom . |
| 1461203 | 1/1977 | United Kingdom . |

Primary Examiner—John Kight, III
Assistant Examiner—Rachel Johnson

[57] ABSTRACT

A process for preparing polymeric foams which comprises reacting:
a) an organic polyisocyanate
b) an isocyanate-reactive composition comprising:
  i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60–1500, and
  ii) a catalytically effective amount of a carbodiimide promoting catalyst, and
  iii) optionally other catalysts and/or further conventional additives, in the substantial absence of water and chlorofluorocarbon blowing agent.

8 Claims, No Drawings

PROCESS FOR PREPARING FOAMS

The invention relates to the preparation of polymeric foams. In particular, the invention relates to the preparation of integral skin foams being at least partially the reaction product of a polyisocyanate with an imino- or enamino functional isocyanate reactive composition.

In the manufacture of self-skinning (integral skin) moulded parts, the use of halohydrocarbons—in particular of chlorofluoro carbons, the so-called CFC's—as physical non reactive blowing agent seems inevitable. This is due to their unique contribution to the formation of the outer skin of the skinned parts. However, the environmental problems encountered with the CFC's call for less harmful alternatives. A partial or complete replacement of the CFC's by $H_2O$—which generates $CO_2$ upon reaction with the isocyanate could be a straightforward solution. Unfortunately, the use of $H_2O$ as blowing agent leads to integral skin foams having generally poor skin properties.

It has now been found surprisingly that integral skin parts having good skin properties can be obtained in the substantial absence of water with total replacement of the CFC, when the carbon dioxide is generated upon formation of carbodiimide linkages during the process in the presence of certain isocyanate reactive ingredients.

It has already been proposed to prepare rigid foams containing both carbodiimide and isocyanurate groups by polymerising an organic polyisocyanate in the presence of a blowing agent, a catalyst which promotes the formation of carbodiimide groups and a catalyst which promotes the formation of isocyanurate groups.

Representative of such teachings are patent publications GB 1234946, GB 1461203, US 4166164.

GB 1234946 relates to carbodiimide/isocyanurate rigid foams obtained by mixing polyisocyanate with a catalyst composition comprising a carbodiimide promoting catalyst and an isocyanurate promoting catalyst—in the absence of any "polyol" component.

The foams are used as insulation material.

U.S. Pat. No. 4,166,164 similarly relates to isocyanurate-carbodiimide foams obtained by using a combination of a catalyst for the formation of carbodiimide linkages and a catalyst for the formation of isocyanurate linkages. The resulting foams are rigid cellular products for insulation.

GB 1461203 relates to the manufacture of rigid foams having carbodiimide, isocyanurate and urethane linkages, by reacting an isocyanate and a "polyol" component in the presence of a catalyst mixture comprising:
a) a catalyst for the formation of urethane linkages
b) a co-catalyst promoting the formation of both isocyanurate and carbodiimide linkages.

The resulting products are rigid cellular products for insulation.

GB 8911853.3 discloses a process allowing for partial replacement of CFC in the manufacture of integral skin foams by incorporating a carbodiimide promoting catalyst into the formulation.

It has now been found that, surprisingly, $CO_2$ generated by a catalyst promoting the formation of carbodiimide linkages can in fact be used as the only blowing agent in the preparation of, in particular self-skinning, foams of any type: flexible, rigid, semi-rigid or elastomeric.

The resulting foams show good properties, in particular the integral skin foams show good skin properties and core densities comparable with corresponding self-skinning foams obtained by using halohydrocarbons as only blowing agent.

Accordingly the present invention provides for a process for preparing polymeric foams which comprises reacting:

a) an organic polyisocyanate
b) an isocyanate-reactive composition comprising:

i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60–1500, and ii) a catalytically effective amount of a carbodiimide promoting catalyst, and iii) optionally other catalysts and/or further conventional additives, in the substantial absence of water and chlorofluorocarbon blowing agent.

It is an essential feature of the present invention that at least 25% of the isocyanate reactive groups of the high molecular weight isocyanate reactive compounds are imino or enamino groups. Preferably this is at least 50% and more preferably at least 75%.

Organic polyisocyanates or polyisocyanate compositions which may be used according the the present invention may include any of the aliphatic, cycloaliphatic, araliphatic or aromatic polyisocyanates known in polyurethane or polyurea chemistry, especially those that are liquid at room temperature.

Examples of suitable polyisocyanates include ethylene diisocyanate, 1,6-hexamethylene diisocyanate, isophorone diisocyanate, cyclohexane-1,4-diisocyanate, 4,4-dicyclohexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4-diphenylmethane diisocyanate, polymethylene polyphenylene polyisocyanates (crude MDI) and 1,5-napthylene diisocyanate. Mixtures of polyisocyanates can be used and also polyisocyanates which have been modified by the introduction of urethane, allophanate, urea, biuret, carbodiimide, uretonimine or isocyanurate residues.

In general, the aromatic polyisocyanates are preferred, especially the available MDI isomers, that is to say 4,4'-diphenylmethane diisocyanate, 2,4'-diphenylmethane diisocyanate and mixtures thereof. MDI variants such as uretonimine-modified MDI and MDI prepolymers are also of great value in the moulding process.

Imino group containing compounds, that is to say imino-functional compounds, which may be used are imino-functional compounds capable of reacting directly with polyisocyanates without prior cleavage of the C=N bond to form a monomeric byproduct. Suitable imino-functional compounds include imino-functional polyether resins.

"Imino-functional" as used herein means that a reactant contains the grouping:

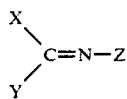

wherein X, Y and Z are chemical moieties which collectively form the rest of said compound and are each independently selected from hydrogen and organic radicals which radicals are attached to the imino unit:

of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through saturated atoms, preferably aliphatic carbon atoms.

The rang of imino-functional reagents which may be used in the invention is not limited by or to any particular chemistry of the preparation of said reagents. For example, imine terminated aliphatic polyethers may be made by a number of different routes. Specifically, the amine groups (—NH$_2$) of an aliphatic amine-terminated polyether can be prereacted with an aldehyde (XCH$_2$CHO) or a ketone (X—CO—Y), to form, respectively, the corresponding aldimine

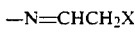

or the corresponding ketimine

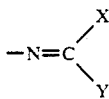

or the aldehyde and/or ketone group of an aldehyde and/or ketone-terminated polyether, can be prereacted with an aliphatic primary mono-amine to form, respectively, the corresponding aldimine and/or ketimine-terminated polyethers:

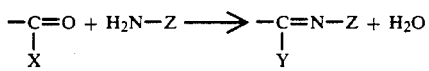

The preparation of imino functional groups in both cyclic and acyclic forms is well known in the literature, such as from "The Chemistry of the Carbon—Nitrogen Double Bond", Ed. S. Patai, Interscience Publishers, London, 1970 and references therein.

Enamine-containing compounds which may be present include compounds having the structures:

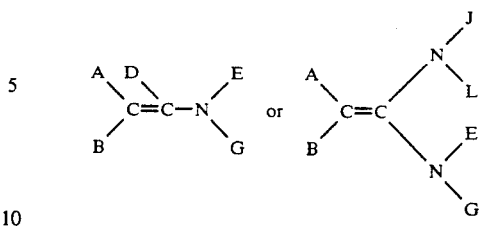

wherein each of A, B, D, E, G, J and L, independently, represents hydrogen or, preferably, an optionally substituted hydrocarbon radical, any of A, B and D and, independently, any of E, G, J and L optionally being joined together to form one ore more carbocyclic or heterocyclic rings.

In many preferred enamine-functional compounds E, G, J and L are not hydrogen. It is also preferred that not both of A and B are hydrogen. Especially useful enamino-functional compounds contain two or more enamine groups as a result of any of A, B, D, E, G, J and/or L being a radical terminating in one or more enamino groups.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexylaldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

Other isocyanate-reactive compounds like polyols and polyamines may be used as well.

As example of suit able polyols there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl)-terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols and triols. Other polyols which may be used comprise dispersions or solutions of addition or condensation polymers in polyols of the types described above. Such modified polyols have been fully described in the prior art and include products obtained by the in situ polymerisation of one or more vinyl monomers, for example styrene and acrylonitrile, in polymeric polyols, for example polyether polyols or by the in situ reaction between a polyisocyanate and an amino-functional and/or alkanol amine or hydroxy-functional compound in a polymeric polyol.

Polyamines having molecular weights of at least 1000 include amino-terminated polythioethers, polyesters, polyesteramides, polycarbonates, polyacetals, polyolefins, polysiloxanes and especially, polyethers. Polyether polyamines which may be used include products obtained by the reductive amination of polyether polyols as described, for example, in U.S. Pat. No. 3,654,370, or by the cyanoethylation of polyols followed by hydrogenation. Polyoxypropylene and poly(oxyethylene-oxypropylene)diamines and triamines and mixtures thereof are preferred.

Also useful are polymers containing both amino and hydroxyl groups obtained by the partial amination of polyols.

Suitable carbodiimide-promoting catalyst to be used in the reaction system of the present invention are those catalysts which are sufficiently reactive within the exotherm profile of the reaction mixture.

Suitable catalysts have already been described: see e.g. U.S. Pat. No. 4,743,626 which is included herein by reference.

Preferred catalysts are phospholene oxide . compounds of following formula—or their salts—:

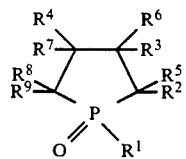

wherein
$R^1$ is substituted or unsubstituted hydrocarbyl group,
$R^2$ or $R^4$ is H, Cl or alkyl of 1 to 12 C, while the other group out of $R^2$ and $R^4$ forms a double bond with $R^3$, and
$R^5$ to $R^9$ are H, Cl or alkyl of 1 to 12 C.

Suitable compounds (generally referred to as phospholene oxide or oxo phospholene compounds) include those for which $R^1$ is methyl, ethyl, propyl, isopropyl, n-butyl, tert-butyl, cyclohexyl, n-dodecyl, phenyl, o-, m- or p-tolyl, xylyl, naphthyl, 4-diphenyl, 2-phenylethyl, 2-chloroethyl, 2-methoxyethyl, o-, m- or p-chlorophenyl, p-methoxyphenyl and p-N, N-dimethylaminophenyl. Preferably, $R^1$ is alkyl of 1 to 4 C, phenyl or benzyl. The group out of $R^2$ and $R^4$ which does not form a double bond with R3 preferably is H.

As examples of $R^5$ to $R^9$, which may be the same òr may be different, there may be mentioned hydrogen, chlorine, methyl, ethyl, propyl, isopropyl and butyl, a preferred lower alkyl group is methyl. Preferably $R^5$ to $R^9$ is H or methyl.

Specific examples of phospholene oxide catalysts which may be used in the present process include:
1-methyl-1-oxo-phospholene
1-ethyl-1-oxo-phospholene
1-phenyl-3-methyl-1-oxo-phospholene
1-benzyl-3-methyl-1-oxo-phospholene
1-ethyl-3-methyl-1-oxo-phospholene Preferred catalysts are 1-methyl-1-oxo-phospholene, 1-ethyl-1-oxo-phospholene and 1-phenyl-3-methyl-1-oxo-phospholene or mixtures thereof.

Amounts of carbodiimide-promoting catalyst to be used in the reaction system of the present invention should not exceed 5% by weight of total isocyanate-reactive composition.

Depending on the kind of self skinning product to be obtained with the reaction system of the present invention—i.e. flexible, rigid, semi-rigid or elastomeric integral skin foams—the following parameters should be adjusted within the reaction system:

a) functionality and molecular weight of the isocyanate-reactive components and b) isocyanate indices i.e. the ratio of isocyanate equivalents.in component A to isocyanate-reactive functional groups in component B of the reaction system.

Thus, for the preparation of rigid integral skin foams, the reaction system according to the present invention will preferably also contain isocyanate-reactive compounds as herebelow described of functionality 2-8 and molecular weight less than 1500—preferably polymeric polyols such as polyether or polyester polyols of functionality 2-8 and OH number of 100-600 mg KOH/g.

Reaction systems for the preparation of rigid integral skin foams should provide isocyanate indices ranging from 90 to 1500 and even higher.

For the preparation of flexible, semi-rigid or elastomeric integral skin foams, reaction systems according to the present invention should preferably contain isocyanate-reactive compounds as hereinbefore described of functionality 2-4, preferably 2-3 and molecular weight ranging from 1500 to 10000, preferably 2000-6000, optionally in admixture with lower molecular weight isocyanate-reactive compounds—the so-called chain extenders—having a molecular weight ranging from 60 to 1500.

The low Mw isocyanate reactive compounds used to prepare the composition of the present invention have a Mw of 60 to 1500, preferably of 60 to 450 and most preferably of 100 to 200. They have an average functionality of 1.8 to 6.

Suitable low molecular weight isocyanate-reactive compounds may be selected from the following classes:
(a) hydroxy compounds
(b) amino compounds
(c) hydroxyamino compounds
(d) imino-functional and/or enamine-containing compounds or mixtures thereof.

Polyols having molecular weights below 1500 include simple non-polymeric diols such as ethylene glycol, propylene glycol, dipropylene glycol, tripropylene glycol and 1,4-butanediol and alkylene oxide adducts of glycerol, sorbitol, sucrose, diamino diphenylmethane and toluene diamine.

Polyamines having molecular weights below 1500 which may be used include aliphatic, cycloaliphatic or araliphatic polyamines containing two or more primary and/or secondary amino groups and aromatic polyamines.

Aromatic polyamines which are useful in the invention particularly include diamines, especially those having molecular weights from 100 to 400, preferably between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3',5,5'-tetraisopropyl-4,4'-diaminodiphenylmethane and mixtures thereof.

Suitable alkanolamines comprise monoethanolamine, diethanolamine and isopropanolamine.

Suitable low Mw imino-functional and/or enamine-containing compounds have the characteristics of the higher molecular weight imino-functional or enamine-containing compounds described above, except that they have a molecular weight below 1500.

Examples of preferred low Mw imino-functional compounds include simple aldimines and/or ketimines such as may be obtained by reacting aldehydes, for example formaldehyde, acetaldehyde, propionaldehyde, n-butyraldehyde, isobutyraldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, diethyl ketone, benzyl methyl ketone or cyclo-hexanone and mixtures thereof with primary amines, especially aliphatic diamines. Examples of suitable amines include hexamethylene diamine, methane diamine, isophorone diamine, xylylene diamine, polyoxyalkylene diamines and/or triamines and mixtures of such amines. Primary mono-amines may also be used either alone or together with diamines.

The amount of isocyanate-reactive compounds having a molecular weight of 60-1500 preferably is 5-25% by weight calculated on the whole isocyanate-reactive composition.

Suitable urethane-promoting catalysts to be used in the reaction system of the present invention are well known in the art.

Examples of suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof.

Tertiary amine catalysts include trialkylamines such as for example, trimethylamine, triethylamine; heterocyclic amines such as N-alkylmorpholines, for example, N-methylmorpholine, N-ethylmorpholine; 2,2'-bis(dimethylamino)diethyl ether; 1,4-dimethylpiperazine, triethylenediamine, and aliphatic polyamines such as N,N,N',N'tetramethyl-1,3-butanediamine or N-methyl diethanolamine. The amount of catalyst used is at most 5% by weight of the total isocyanate-reactive composition, preferably less than 1%. Combinations of tertiary amine and organotin catalysts may be used as well.

Optionally, where needed, a catalyst for the isocyanate-amine reaction can also be included in the reaction system of the present invention. Examples of those more specific catalysts include carboxylic acids, and precursors thereof (such as acid anhydrides). Specific examples of carboxylic acid catalysts include oleic acid, 1,12-dodecanedioic acid, isophthalic acid, etc. These types of catalysts are described in U.S. Pat. Nos. 4,499,254; 4,487,908; and 4,487,912.

When used, their amounts should not exceed 5% by weight of total isocyanate-reactive composition.

It is also within the scope of the present invention to use the above urethane-promoting or urea-promoting catalyst(s) in the isocyanate composition or as a separate stream.

The reaction system of the present invention may further contain other conventional ingredients of such systems such as internal mould release agents, surfactants, fillers (which may be reinforcements), plasticizers, fire retardants, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available form Goldschmidt AG).

The amount of internal mould release agent used can be from about 0.001 to about 5.0 percent by weight of the total reactants (i.e. total polymer).

Suitable surfactants include, for example, sodium salts of castor oil sulfonates alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable fillers include fibreglass reinforcement fibres, particularly those having lengths of from about 1/16 inch (0.16 cm) to about ½ inch (1.27 cm) and milled glass fibres having a length of 1/16 inch (0.16 cm), ⅛ inch (0.32 cm) or ¼ inch (0.64 cm) and the like. Shorter fibres are always preferred for ease of processing when they are incorporated as part of the "A" or "B" component streams.

Other particularly suitable fillers are mica, fumed silica, flake glass, Wollastonite, calcium carbonate, carbon black, barium sulfate and the like.

Organic fillers can also be used such as urea or urethane particles or olefinic unsaturated polymer particles (referred to as polymer polyols).

By suitable choice of ingredients, concentrations and processing conditions of the products of the present invention poly(urethane-carbodiimide) or polyurea-poly(urethane-carbodiimide) articles can be obtained, which may have open and/or closed cells.

The isocyanate-reactive mixture B is produced by combining the ingredients by simple mixing at a temperature between −20° C. to 80° C. until a homogenous blend or a stable dispersion is obtained. The isocyanate-reactive blends should preferably be prepared in an inert, anhydrous atmosphere.

Another aspect of the present invention is to provide a reaction system comprising:
a) an organic polyisocyanate,
b) an isocyanate-reactive composition comprising:
i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60–1500, and
ii) a catalytically effective amount of a carbodiimide promoting catalyst, and
iii) optionally other catalysts and/or further conventional additives, in the substantial absence of water and chlorofluorocarbon blowing agent Further the present invention is concerned with an isocyanate reactive composition comprising:
i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60–1500, and
ii) a catalytically effective amount of a carbodiimide promoting catalyst, and
iii) optionally other catalysts and/or further conventional additives, in the substantial absence of water and chlorofluorocarbon blowing agent.

A small amount of water may however be present for example as a residual component of the polyol, polyamine, polyimine, chain extender or catalyst used to prepare such composition. The amount of water will preferably not exceed 0.1% by weight of total isocyanate-reactive composition.

Methods to prepare self skinning parts are well known in the art and have already been described (see e.g. "The ICI Polyurethane Book"—G. Woods—Wiley—1987).

Thus integral skin foams are obtained by introducing into a closed mould the foaming composition and by overpacking the mould.

The injection of the reaction mixture into the mould can be made according to any conventional means or by the reaction injection moulding process—the so-called RIM process.

The surface layer or skin is formed upon contact of the foaming mixture with the relatively cool mould surface, under a pressure greater than atmospheric pressure.

The invention is illustrated but not limited by the following example.

EXAMPLE

"Suprasec" VM 20 polyisocyanate (obtainable from ICI PLC, "Suprasec" is a trademark of Imperial Chemical Industries PLC) preheated at 40° C. was reacted at an index of 120 with an isocyanate-reactive composition in a closed mould. The mould temperature was 35° C. After 7 minutes the part was demoulded. The part was produced at a moulding density of 390 Kg/m$^3$. The part has a Shore A hardness of 68, tensile strength at break of 2410 kPa, a tear strength of 2000 N/m and a compression set (70° C., 24h) of 39%.

The isocyanate-reactive composition used comprised 100 pbw of the reaction product of Jeffamine T 5000 and excess cyclohexanone after having removed toluene as diluent, water and remaining cyclohexanone; 8 pbw of monoethylene glycol, 1 pbw of 1-methyl-oxo-phospholene and 0.1 pbw of DABCO 1027.

I claim:

1. A process for preparing polymeric foams which comprises reacting:
a) an organic polyisocyanate
b) an isocyanate-reactive composition comprising:
i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60–1500, and
ii) a catalytically effective amount of a carbodiimide promoting catalyst, and
iii) optionally other catalysts and/or further conventional additives, in the substantial absence of water and blowing agent.

2. A process according to claim 1 wherein the reaction is performed in a closed mold to prepare an integral skin foam.

3. A process according to claims 1 or 2 wherein the carbodiimide-promoting catalyst is 1-methyl-1-oxo-phospholene, 1-ethyl-1-oxo-phospholene or 1-phenyl-3-methyl-1-oxo-phospholene or mixtures thereof.

4. A process according to claim 1 wherein the isocyanate reactive compound having a molecular weight of 60–1500 is present in an amount of 5 to 25% weight based on the total isocyanate-reactive composition.

5. A reaction system comprising:
a) an inorganic polyisocyanate
b) an isocyanate-reactive composition comprising:
i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60–1500, and
ii) a catalytically effective amount of a carbodiimide promoting catalyst, and iii) optionally other catalysts and/or further conventional additives, in the substantial absence of water and blowing agent.

6. A composition according to claim 5 wherein at least 50% of the isocyanate-reactive groups of the compounds having a molecular weight of above 1500 are imino or enamino.

7. A composition according to claim 5 wherein at least 75% of the isocyanate reactive groups of the compounds having a molecular weight of above 1500 are imino or enamino.

8. Isocyanate-reactive composition comprising i) an organic polyfunctional isocyanate reactive composition comprising at least 50% w of polyfunctional isocyanate reactive compounds having a molecular weight of above 1500 wherein at least 25% of the isocyanate reactive groups are imino or enamino groups, and at most 50% by weight of polyfunctional isocyanate reactive compounds having a molecular weight of 60-1500, and ii) a catalytically effective amount of a carbodiimide promoting catalyst, and iii) optionally other catalysts and/or further conventional additives, in the substantial absence of water and chlorofluorocarbon blowing agent.

* * * * *